(12) United States Patent
Wiedenheft

(10) Patent No.: US 6,860,382 B2
(45) Date of Patent: Mar. 1, 2005

(54) TAIL SHAFT ADJUSTING SYSTEM

(76) Inventor: William Wiedenheft, 4611 Cleveland Rd. East, #922, Huron, OH (US) 44839

( * ) Notice: Subject to any disclaimer, the term of this patent is extended or adjusted under 35 U.S.C. 154(b) by 0 days.

(21) Appl. No.: 10/449,895

(22) Filed: Jun. 2, 2003

(65) Prior Publication Data

US 2004/0238331 A1 Dec. 2, 2004

(51) Int. Cl.⁷ .............................................. B65G 23/44
(52) U.S. Cl. ....................................................... 198/813
(58) Field of Search ............................... 198/813, 810.4, 198/810.04

(56) References Cited

U.S. PATENT DOCUMENTS

| | | | | |
|---|---|---|---|---|
| 5,174,435 A | * | 12/1992 | Dorner et al. ............... | 198/806 |
| 5,378,202 A | * | 1/1995 | Swinderman ............... | 198/499 |
| 5,615,775 A | * | 4/1997 | Barbaret ..................... | 209/219 |
| 5,641,058 A | * | 6/1997 | Merten et al. ......... | 198/810.04 |
| 6,209,715 B1 | * | 4/2001 | Eltvedt ....................... | 198/813 |
| 6,315,105 B1 | | 11/2001 | Gibbs et al. | |
| 6,685,009 B1 | * | 2/2004 | Hosch et al. ............... | 198/813 |

* cited by examiner

Primary Examiner—Gene O. Crawford
(74) Attorney, Agent, or Firm—Lindon & Lindon

(57) ABSTRACT

A pulley adjusting system having a housing having an opening on a surface thereof, and an insert having an opening on a surface thereof. The insert and the housing are slidably connected. The insert is operatively connected to a belt.

2 Claims, 4 Drawing Sheets

TAIL SHAFT ADJUSTING SYSTEM

BACKGROUND OF THE INVENTION

Conveyors are widely used to quickly and efficiently move objects and material from one location to another. Many conveyors include a continuous loop conveyor belt that is looped over a rotatable head pulley and a rotatable tail pulley. The head pulley may be powered to rotate in a direction that pulls an upper portion of the conveyor belt that is between the head and tail pulleys toward the head pulley, thus conveying a load towards the head pulley. A lower portion of the conveyor belt is relatively slack and moves from the head pulley towards the tail pulley. Objects and material may be loaded onto the conveyor belt along the top portion and unloaded or discharged at the location of the head pulley as the conveyor belt moves around the head pulley. The conveyor belt may be supported between the head and tail pulleys on rollers and the like.

Conveyor components are susceptible to malfunction, wear, corrosion and stress as a result of the rigors of use present in many applications, such as mining and quarrying. Improper tension of the conveyor belt can result in breakdowns and inefficiencies. The need to repair or adjust conveyor components imposes additional costs and requires additional labor, and may even require the stopping of the conveyor, thereby causing the loss of production. There is a long-felt need for an improved means to increase or decrease conveyor belt tension or remove or change the conveyor belt.

SUMMARY OF THE INVENTION

The above advantages as well as other advantages not specifically enumerated are achieved by a pulley adjusting system having a housing having an opening on a surface thereof, and an insert having an opening on a surface thereof. The insert and the housing are slidably connected. The insert is operatively connected to a belt.

There is also provided a method of adjusting the tension of a belt The method includes providing a housing having an opening therein and providing an insert having an opening therein. The housing and the insert are slidably connected. The insert is moved. The insert is operatively connected to the belt.

There is also provided a method of removing a belt The method includes providing a housing and an insert. The housing and the insert are slidably connected. The insert is operatively connected to the belt. The insert is moved.

Various advantages of this invention will become apparent to those skilled in the art from the following detailed description of the preferred embodiment, when read in light of the accompanying drawings.

DETAILED DESCRIPTION OF THE INVENTION

Preliminarily, it should be noted that certain terms used herein, such as for example "left", "right", "above", and "below", are used to facilitate the description of the invention. Unless otherwise specified or made apparent by the context of the discussion, such terms and other directional terms should be interpreted with reference to the figure(s) under discussion. Such terms are not intended as a limitation on the position in which the invention or components may be used. Indeed, it is contemplated that the components of the invention may be easily positioned in any desired orientation for use. Likewise, numerical terms such as for example "first", and "second" are not intended as a limitation or to imply a sequence, unless otherwise specified or made apparent by the context of the discussion.

Figure 1:
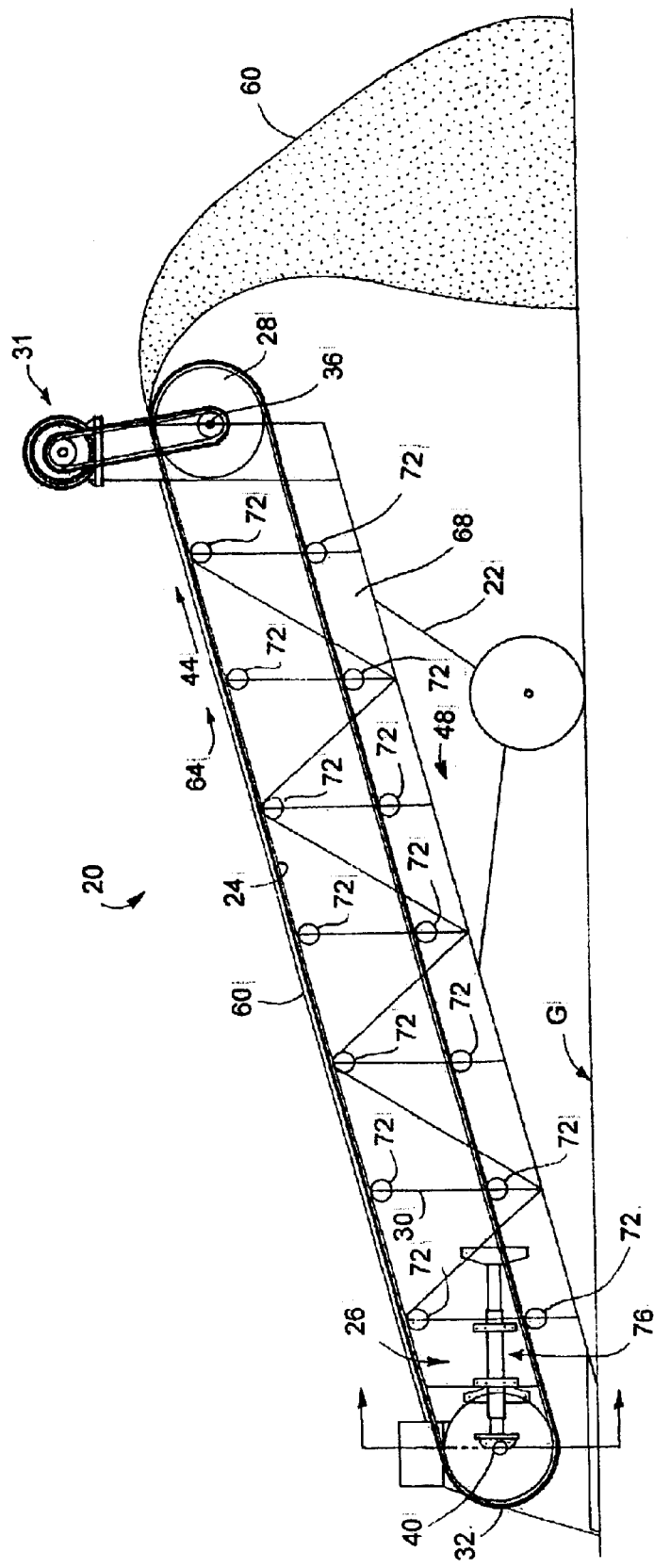
FIG. 1 is a view in elevation of portions of a conveyor system employing a tail pulley adjusting system in accordance with this invention.
Figure 2:
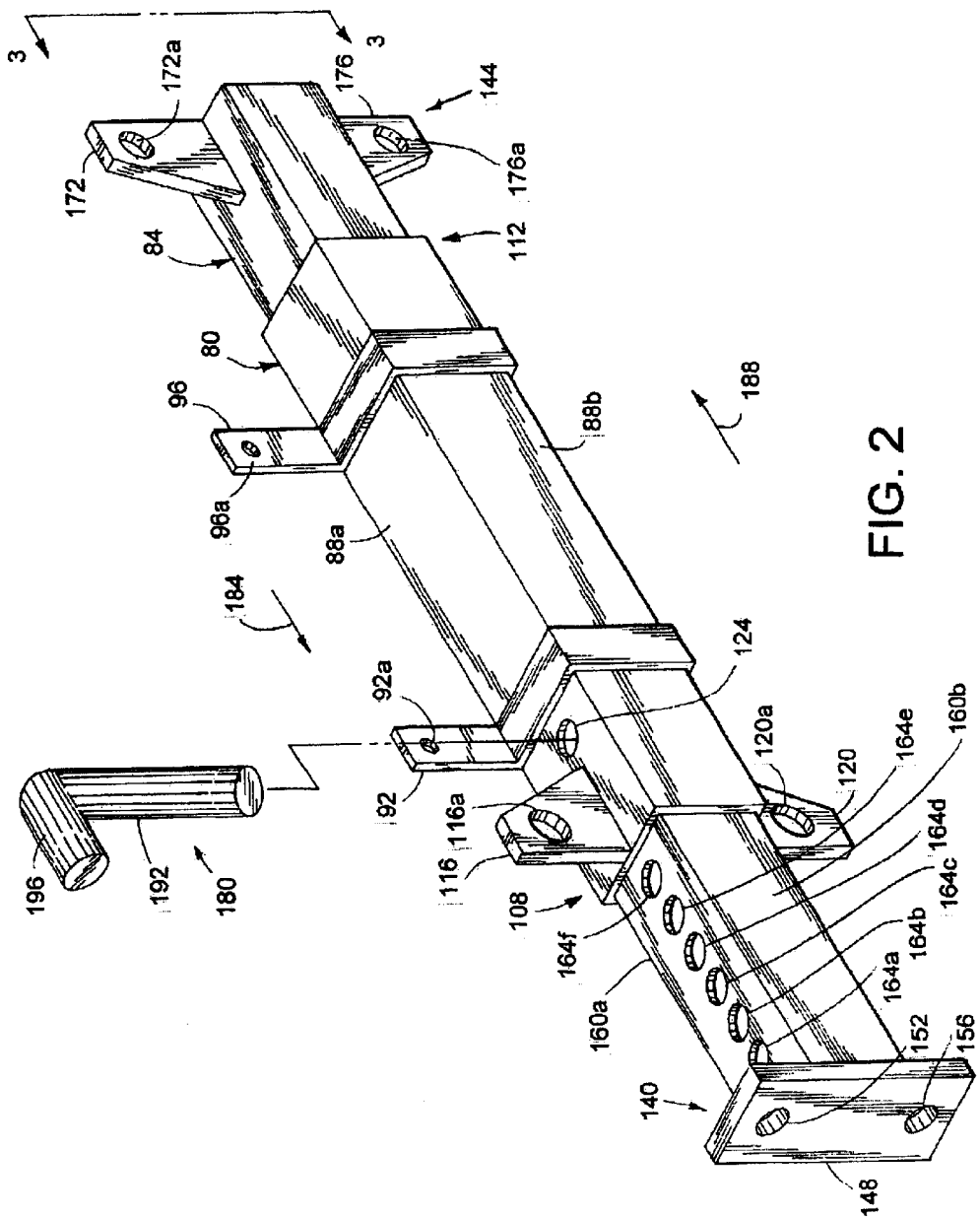
FIG. 2 is a view in perspective [viewed along line 3—3 of FIG. 3] of the tail pulley adjusting system shown in FIG. 1.
Figure 3:
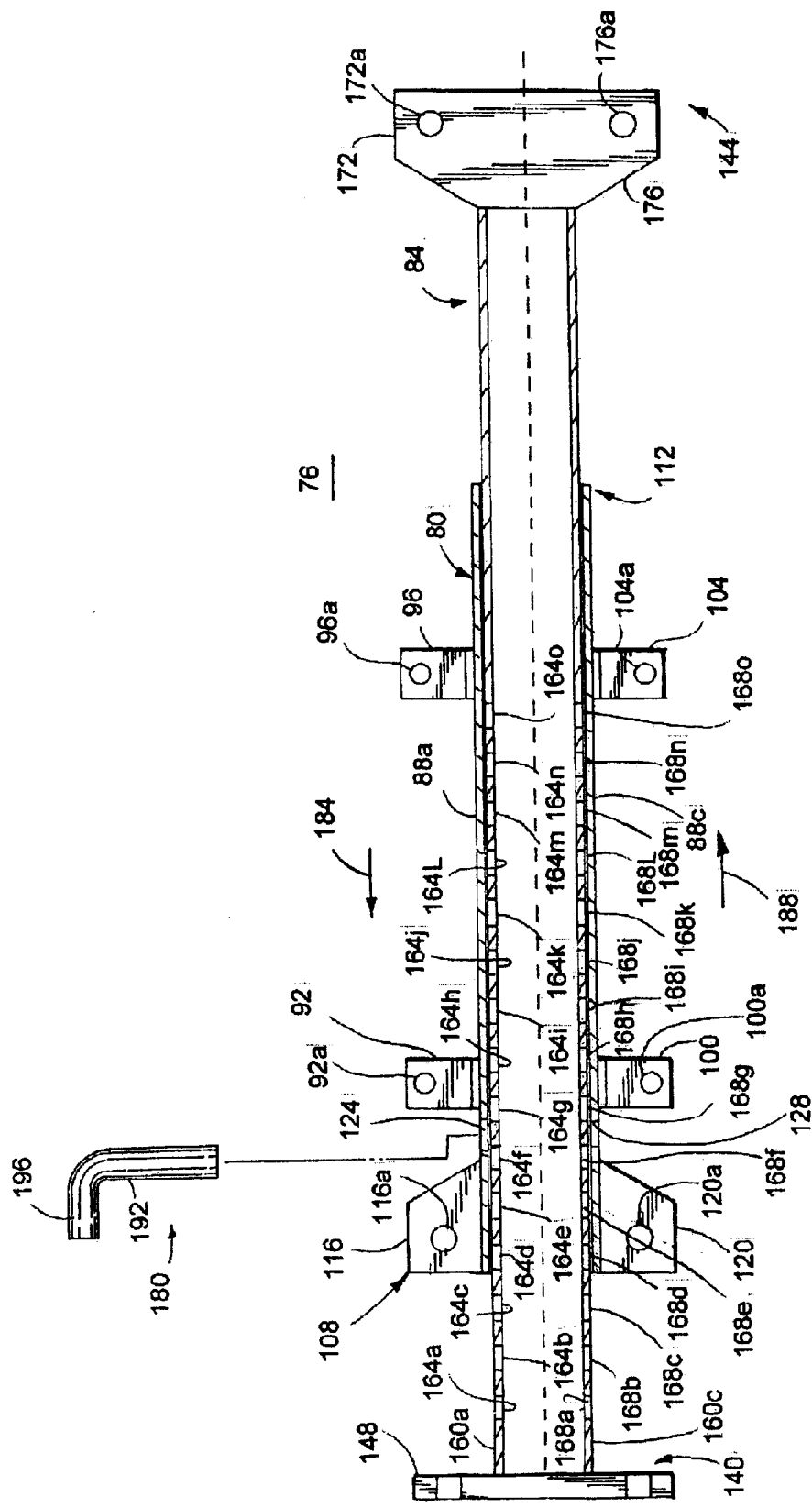
FIG. 3 is an elevation view in cross-section of the tail pulley adjusting system shown in FIG. 2.

Referring now to the drawings, there is illustrated in FIGS. 1 through 3 a conveyor system, indicated generally at 20, according to the invention. The conveyor system 20 includes a belt 24, a head pulley 28, and a tail pulley 32. The illustrated belt 24 is a continuous loop. The illustrated conveyor system 20 includes an elevating system 22. The elevating system 22 is operative to raise the head pulley 28 relative to the tail pulley 32, thus having the belt 24 positioned at an angle A relative to the ground G. The angle A is measured between an axis B extending through the tail pulley 32 and the ground G. The illustrated conveyor system 20 also includes a support 26 secured to a frame 30. The support 26 is operative to support a tail pulley adjusting system 76 (seen in more detail in FIGS. 2 and 3).

The head pulley 28 is positioned to rotate around a head axel 36. The tail pulley 32 is positioned to rotate around a tail axel 40. The head pulley 28 is positioned above the tail pulley 32. The relative positions of the head pulley 28 and the tail pulley 32 are not a limitation on the invention. When the belt 24 rotates around the tail pulley 32, an upper portion 64 of the belt 24 supports a load 60 to move in the direction generally indicated by arrow 44. The term "load" is understood to include the quantity or weight of material or objects to be carried or moved. The illustrated load 60 is a rock material. The invention is not limited to use with rock material loads, and may be practiced with any suitable load. As a lower portion 68 of the belt 24 rotates around the head pulley 28, the load 60 is removed by gravity as illustrated, though may be removed by any suitable means. One or more rollers 72 may be employed to support the upper portion 64 of the belt 24 or the lower portion 68 of the belt 24. A motor 31 may be employed to assist in moving the belt 24. The motor 31 may be positioned proximate the head pulley 28 or at any other suitable location. The term "proximate" is understood to include structures that are relatively near to each other, which may or may not be in contact with each other. The illustrated motor 31 is operatively connected to the head pulley 28.

Referring now primarily FIGS. 2 and 3, the illustrated tail pulley adjusting system 76 includes a housing 80 and an insert 84. The term "housing" is understood to include structures and means to substantially contain, encase or enclose. The term "insert" is understood to include structures and means which are embedded in, into, or within, set in, into, or within, or located in, into, or within. It will be noted that the insert 84 is substantially within the housing. The illustrated housing 80 is positioned substantially outward of the insert 84. The illustrated insert 84 is positioned substantially inward of the housing 80.

The tail pulley adjusting system 76 is a means for adjusting the tension of the belt 24. The tail pulley adjusting system 76 is a pulley adjusting system. The tail pulley adjusting system 76 is a means for adjusting the position or location of the tail pulley tail pulley 32 when employed as illustrated. It will be noted that the tail pulley adjusting system 76 is operatively connected to the belt 24. It will be noted that the tail pulley adjusting system 76 is operatively connected to the conveyor system 20. The tail pulley adjusting system 76 is a pulley adjusting system.

The housing 80 may be a tube, or be generally tubular in shape. The insert 84 may be a tube, or be generally tubular in shape. The term "tube" is understood to include a wide variety of elongated generally cylindrical structures, which may or may not be generally hollow. The housing 80 and the insert 84 may be slidably connected. It will be appreciated that the illustrated housing 80 and the insert 84 are substantially coaxial with each other. The illustrated housing 80 has a generally square cross-sectional shape.

Three substantially flat faces 88a, 88b, and 88c of the housing 80 are shown. The faces 88a, 88b, and 88c are surfaces. A first bracket 92 having an opening 92a therein is secured to the housing 80. A second bracket 96 having an opening 96a therein is also secured to the housing 80. A third bracket 100 and a fourth bracket 104 are also secured to the housing 80. The first bracket 92, the second bracket 96, the third bracket 100, and the fourth bracket 104 are provided to secure the housing 80, to the support 26 (shown in FIG. 1) and are operative to position the housing 80 substantially stationary relative to the insert 84. Any suitable number of brackets may be employed and may be positioned other than as illustrated. Other means to hold the housing 80 substantially stationary may be employed. The illustrated housing 80 includes a first end 108 and a second end 112. The first end 108 of the housing 80 features a first pulling eye 116 having an opening 116a therein.

The first pulling eye 116 is positioned on the face 88a. The first end 108 of the housing 80 also features a second pulling eye 120 having an opening 120a therein. The second pulling eye 120 is positioned on the face 88c. Any suitable number of pulling eyes may be employed and may be positioned other than as illustrated on the housing 80.

The illustrated housing 80 includes an opening 124 in the face 88a. The opening 124 is generally round and is positioned at the first end 108 between the first pulling eye 116 and the first bracket 92. The opening 124 may have any suitable shape and may be positioned at any suitable location on the housing 80. The illustrated housing 80 also includes an opening 128 in the face 88c. The opening 128 is generally round and is positioned at the first end 108 between the second pulling eye 120 and the third bracket 100. The opening 128 may have any suitable shape and my be positioned at any suitable location on the housing 80. It will be appreciated that the opening 128 in the face 88c and the opening 124 in the face 88a are provided along an axis C.

The illustrated insert 84 has a generally square cross-sectional shape. The illustrated insert 84 includes a first end 140 and a second end 144. A plate 148 may be provided at the first end 140 of the insert 84 of the tail pulley adjusting system 76. The illustrated plate 148 is generally square and include two openings 152 and 156 therein.

Three substantially flat faces 160a, 160b, and 160c are shown for the insert 84. The faces 160a, 160b, and 160c are surfaces. The face 160a includes 15 openings 164a through 164o. The illustrated openings 164a through 164o are generally round. The openings 164a through 164o may be positioned along an array as illustrated. The face 160c includes 15 openings 168a through 168o. The illustrated openings 168a through 168o are generally round. The openings 168a through 168o may be positioned along an array as illustrated. The insert 84 may include any suitable number of openings, and the openings may be positioned as desired.

It will be noted that the openings 164a through 164o in the face 160a and the openings 168a through 168o in the face 160c are positioned to align with each other along a series of axes positioned generally perpendicular to the insert 84, the axes traversing through the faces 160a, and 160c. For example, the opening 164a and the opening 168a are aligned along an axis (not shown) positioned generally perpendicular to the insert 84, the axis traversing through the faces 160a, and 160c. Likewise, the opening 164b and the opening 168b are aligned along an axis (not shown) positioned generally perpendicular to the insert 84, the axis traversing through the faces 160a, and 160c.

The second end 144 of the insert 84 features a third pulling eye 172 having an opening 172a therein. The third pulling eye 172 is positioned on the face 160a of the insert 84. The second end 144 of the insert 84 also features a fourth pulling eye 176 having an opening 176a therein. The fourth pulling eye 176 is positioned on the face 160c of the insert 84. Any suitable number of pulling eyes may be employed and may be positioned other than as illustrated on the insert 84.

A pin 180 may be employed. The pin 180 is a means for holding the insert 84 substantially stationary relative to the housing 80. It will be appreciated that, when the pin 180 is not employed, the insert 84 preferably is slidable relative to the housing 80 as indicated by directional arrow 184 and directional arrow 188. The pin 180 includes a shaft 192 and a head 196. The head 196 may be positioned generally perpendicular to the shaft 192 of the pin 180. The shaft 192 preferably has a shape that is the same as the shape of the openings 168a through 168o in the face 160c. The shaft 192 preferably has a shape that is the same as the shape of the openings 164a through 164o in the in the face 160a. The shaft 192 preferably has a shape that is the same as the shape of the openings 168a through 168o in the face 160c, In operation, the pin 180 is operative to hold the insert 84 substantially stationary relative to the housing 80. In operation, the shaft 192 of the pin 180 is positioned through the opening 124 in the face 881 of the housing 80 and the opening 128 in the face 88c of the housing 80 along the axis C. In operation, the shaft 192 of the pin 180 is positioned through a desired one of the openings 164a through 164o in the face 160a of the insert 84 one of the openings 168a through 168o in the face 160c of the insert 84. When inserted, the shaft 192 of the pin 180 is preferably positioned through a total of four openings. The head 196 is operative to help prevent the pin 180 from falling through the four openings.

The relative positions of the housing 80 and the insert 84 may be adjusted by a suitable chain come-along (not shown) or other suitable means. As the distance between the first end 108 of the housing 80 and the second end 144 of the insert 84 is reduced, the tension on the belt 24 is increased. The term "tension" is understood to include the condition or degree of being stretched or loosened to a stiffness. The term "tension" is also understood to include the condition or degree of looseness or tautness. As the distance between the first end 108 of the housing 80 and the second end 144 of the insert 84 is increased, the tension on the belt 24 is reduced. The chain come-along may be employed to pull the first pulling eye 116 or second pulling eye 120 toward the third pulling eye 172 or the fourth pulling eye 176, respectively. The illustrated plate 148 is the means by which the first end 140 of the insert 84 is operatively connected to the tail pulley 32.

One or more bearings 190a, 190b, 190c, 190d may be employed. The term "bearing" is understood to include a structure or means able to support the weight of something. The term "bearing" is also understood to include a part that reduces friction between parts. In conjunction with the present invention, the bearings 190a, 190b are positioned proximate the tail pulley 32 and are operative to support the weight of the tail pulley 32. The bearings 190a, 190b may be secured to the plate 148 at the first end 140 of the insert 84 of the tail pulley adjusting system 76 via the two openings 152 and 156 in the plate 148.

Figure 4:
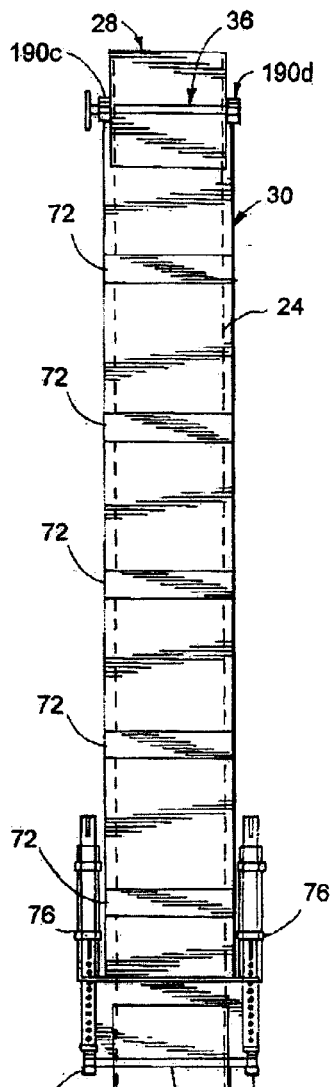
FIG. 4 is a top plan view of the conveyor system of FIG. 1 employing two tail pulley adjusting systems.
Figure 5:
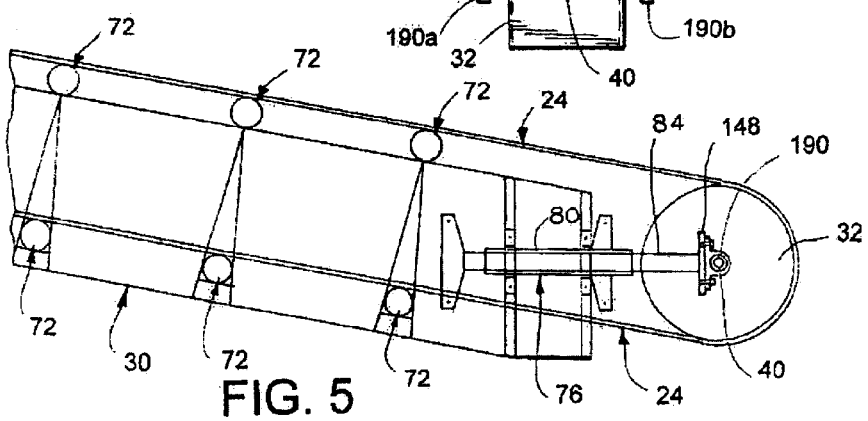
FIG. 5 is an elevation view of a portion of the conveyor system of FIG. 1 employing the tail pulley adjusting system.

The tail pulley adjusting system 76 may be employed at any suitable location on the conveyor system 20. It will be noted that the conveyor system 20 may employ the tail pulley adjusting system 76 on the right side or left side [as shown in FIG. 4]. The tail pulley adjusting system 76 may be positioned on both sides of the frame 30 or the belt 24, or at any suitable position or location with respect to the conveyor system 20.

A model of the tail pulley adjusting system 76 was produced by Latanick Equipment Inc. of Huron, Ohio under secrecy.

The tail pulley adjusting system 76 need not be employed with a conveyor system. The tail pulley adjusting system 76 may be used to change the position or location of any suitable component. For example, the tail pulley adjusting system 76 may be employed in connection with any suitable mechanical, chemical or electrical component. When used with a conveyor system, the tail pulley adjusting system 76 may be used to change the position or location of a head pulley, roller, or any other conveyor component. The tail pulley adjusting system 76 may be made of any suitable size, scale or materials as desired.

The tail pulley adjusting system 76 may be employed in removing or changing the belt 24. To remove the belt, the distance between the first end 108 of the housing 80 and the second end 144 of the insert 84 is increased, thus reducing the tension on the belt 24. The belt 24 is removed. To change the belt 24, the distance between the first end 108 of the housing 80 and the second end 144 of the insert 84 is increased, thus reducing the tension on the belt 24. The belt 24 is removed. The belt 24 is replaced. The distance between the first end 108 of the housing 80 and the second end 144 of the insert 84 is reduced, thus increasing the tension on the belt 24.

The principle and mode of operation of this invention have been described in its preferred embodiments. However, it should be noted that this invention may be practiced otherwise than as specifically illustrated and described without departing from its scope.

What is claimed is:

1. A pulley adjusting system comprising:
   a housing having a pulling eye and an opening on a surface of the housing, and
   an insert having an opening on a surface thereof, the insert and the housing being slidably connected,
   wherein the insert is operatively connected to a belt.

2. A pulley adjusting system comprising:
   a housing having an opening on a surface thereof, and
   an insert having a pulling eye and an opening on a surface of the insert, the insert and the housing being slidably connected,
   wherein the insert is operatively connected to a belt.

* * * * *